United States Patent
Chambers

(10) Patent No.: US 8,037,610 B2
(45) Date of Patent: Oct. 18, 2011

(54) POWERED GROOVER WITH AIRFLOW FIN

(75) Inventor: Gregory Joseph Chambers, Morgan Hill, CA (US)

(73) Assignee: Crain Cutter Co., Inc., Milpitas, CA (US)

( * ) Notice: Subject to any disclaimer, the term of this patent is extended or adjusted under 35 U.S.C. 154(b) by 418 days.

(21) Appl. No.: 12/346,076

(22) Filed: Dec. 30, 2008

(65) Prior Publication Data

US 2010/0162571 A1 Jul. 1, 2010

(51) Int. Cl.
*B27B 9/00* (2006.01)
*B23D 59/00* (2006.01)

(52) U.S. Cl. .......... 30/124; 30/388; 30/374; 30/391; 30/516; 83/520; 83/100; 83/834

(58) Field of Classification Search ............ 30/388, 30/376, 520, 391, 123, DIG. 1, 374, 389, 30/124, 390, 373; 125/13.01; 362/33, 227, 362/232; 83/520, 471, 471.3, 698.41, 521, 83/76, 100, 835, 478, 663; 320/114, 107, 320/117, 116, 112
See application file for complete search history.

(56) References Cited

U.S. PATENT DOCUMENTS

| | | | | |
|---|---|---|---|---|
| 4,761,884 A * | 8/1988 | Nguyen et al. | ........... | 30/373 |
| 5,327,649 A * | 7/1994 | Skinner | ........... | 30/124 |
| 6,167,626 B1 * | 1/2001 | Doumani et al. | ........... | 30/124 |
| 6,269,543 B1 * | 8/2001 | Ohkouchi | ........... | 30/391 |
| 6,557,261 B1 * | 5/2003 | Buser et al. | ........... | 30/124 |
| 7,475,482 B2 * | 1/2009 | Bocka et al. | ........... | 30/376 |
| 2006/0169111 A1 * | 8/2006 | Kozlowski | ........... | 83/13 |
| 2009/0049970 A1 * | 2/2009 | Thomas et al. | ........... | 83/440.2 |

* cited by examiner

*Primary Examiner* — Ghassem Alie
(74) *Attorney, Agent, or Firm* — Fenwick & West LLP

(57) ABSTRACT

A powered vinyl groover includes a motor attached to a circular blade and a blade housing for covering the circular blade. The blade housing includes a duct to carry cuttings into a collection bag. Near an inlet hole of the duct is a fin, which may be a raised surface on any interior wall of the blade housing extending into the blade housing as close as possible to the blade. The fin causes airflow from the blade to be redirected towards the inlet hole of the duct so that more cuttings enter the duct and are carried by the duct through to an outlet hole to a collection bag mountable over the outlet hole of the duct. The fin may be integral with the blade housing or attached to it, and a fin may also be added to existing groovers.

14 Claims, 4 Drawing Sheets

POWERED GROOVER WITH AIRFLOW FIN

BACKGROUND

This invention relates generally to flooring tools, and in particular to powered groovers for use with flooring materials and the collection of chips and dust created by their use.

In the installation of certain sheet vinyl flooring materials, such as Armstrong Medintech solid vinyl or Forbo Marmoleum linoleum, seams in the sheets of the material may be grooved and welded. These types of flooring materials are preferred for hospitals and kitchens because the seams can be completely fused together with the welding process. The welding of seams prevents pathogens from growing in the seams. Powered groovers are also used with other types of flooring materials not made from vinyl, such as commercial linoleum.

These sheet flooring materials come in rolls of a fixed width. The installer cuts multiple sheet lengths to the desired dimensions for the room, and then adheres them to the floor using adhesives. At the seams, the installers often use an electrically powered vinyl groover to form a precision groove in the seam, which can later be filled by heat welding filler material into the groove. Prior art electrically powered vinyl groovers are typically specialized adaptations of electrically powered circular saws or routers. Typically the saw motor has been pivotably mounted on a base having guide wheels. The guide wheels track in the seamline, thereby ensuring that the blade is always centered on the seamline as the groover is wheeled down the seam. The spring-loaded pivot enables the blade to be moved angularly up or down. Thus, the spinning blade may be plunged into the seam at the start of the grooving operation, and is automatically raised out of the groove at the end.

Excessive cuttings and dust from power tools are undesirable especially in hospital and kitchen installations. Hence, most prior art power groovers have some capability to collect cuttings within a removable bag for disposal. The collection system for most prior art groovers has functioned as follows: As the blade moves through the material, cuttings accumulate on the teeth and are subsequently ejected from the blade within a blade housing. The cuttings fly off the teeth on a tangent. Airflow generated by the spinning circular saw blade is used to carry the cuttings to a strategically positioned hole in the blade housing, then through a duct leading to an attached collection bag. The user can easily remove the bag and dump the cuttings. However, with increasing labor costs for cleanup, and increasing liability concerns in hospital construction, flooring installers prefer an improved dust and cuttings collection system. One way to improve upon this type dust and cuttings collection system would be to provide means of increasing the amount of airflow directed towards the duct.

In prior art power groovers, the blade housing is defined physically in terms of a first inner wall, a second outer wall, a third perimeter wall joining the inner wall and outer wall, and a fourth bottom wall. The inner and outer walls have in some cases been integral surfaces of cast parts having fairly sheer inner surfaces. In other groovers, the outer wall is formed by means of a separate cover plate, but the inner surfaces of such cover plates have also been sheer. The third perimeter wall extends perpendicularly to connect the inner and outer walls. With respect to groovers having cover plates, the cover plate is typically fastened to the perimeter wall.

The blade housing castings for some groovers have an integral bottom wall. Others have a separate catch component that is typically mounted to the base. Either design includes a slot through which the blade may pass.

For example, in a prior art groover called the Frasjunior, manufactured by Wolff Tools of Germany, the blade housing is an integral cavity in an adapter casting which is fastenable to a router type motor. The blade housing cavity appears to have been formed by a "lost wax" or "breakout mold" type insert placed inserted within the die. This shape of the insert creates a blade housing with a sheer vertical inner wall, a sheer vertical outer wall, and a perimeter wall. The bottom wall is formed by a separate catch component fastened to the base.

The casting forming the blade housing includes a forward pivot arm. The motor and blade housing are mounted to the base at the pivot arm. The blade passes through the catch on the base to cut the groove.

Forming raised features such as bosses or ribs within insert cavities such as this groover's blade housing can be quite complicated, as the insert becomes very difficult to remove. In fact, the blade housing of the Frasjunior in fact has no such raised internal features. Hence, neither the inner wall, perimeter wall, or outer wall of this blade housing have any raised features such as bosses or ribs formed on or fastened to them which may serve to increase the forcefulness of airflow towards the inlet hole of a their duct.

In another prior art groover called the Grooving Machine EASY 5000, manufactured by Roll Bodentechnik, Ltd. of Germany, the blade housing is formed by a casting fastened on one side to the motor. On the opposite side, the casting forms an integral inner wall and perimeter wall for a blade housing. A separate cover plate fastens onto holes tapped in the perimeter wall to form the blade housing's outer wall. The separate cover plate simplifies the casting process as no inserts are required. The bottom wall is formed by a separate catch fastened to the base. Neither the inner wall, perimeter wall, or inner surface of the cover plate forming the outer wall of this blade housing have any raised features such as bosses or ribs formed on or fastened to them which may serve to increase the forcefulness of airflow towards the inlet hole of their duct. However, the inner wall of this groover's blade housing does contain a hollowed slot that will be discussed below in relation to its inlet hole.

In another prior art groover called the Frasmaster (also manufactured by Wolff Tools of Germany), the blade housing is formed by a first, inner wall made from a flat metal plate mounted at a right angle to the base. A cast cover defining the outer wall and the perimeter wall is fastened to the plate to form the outer wall of blade housing. For its bottom wall, this groover includes a separate catch mounted to the metal plate. In this design, the blade housing is fixed, and motor spindle and attached blade are designed to move up and down within the blade housing, by means of a pivoting mount located outside the blade housing. Hence, the plate includes a slot through which the motor spindle passes into the blade housing.

With respect to the Frasmaster groover, the motor mount and pivot arm are separate components from the blade housing, making this tool more complicated and expensive. Furthermore, the inner wall, outer wall, and perimeter wall of the blade housing of the Frasmaster have no raised features such as bosses or ribs formed on or fastened to them which may serve to increase the forcefulness of airflow towards the inlet hole of a duct.

In another prior art groover, the Leister BA Flooring Groover manufactured by Leister Process Technologies of Switzerland, the blade housing is one integral shape in a large, multifaceted casting also forming the base for the tool. Hence, the blade housing is fixed to the base, and (similarly to the Frasmaster) the blade moves up and down within the blade housing. The inner wall and perimeter wall of the housing are formed in the base. The outer wall is formed as a cover plate fastened to the perimeter wall. The blade housing of this groover has an integral bottom wall with a slot for the blade. The hinged motor mount for this groover is mounted to the base outside the blade housing Oust as the Frasmaster). Hence the inner wall requires a large hole through which the motor spindle may pass.

With respect to the Leister BA Flooring Groover, having the base casting include an integral blade housing requires a large, complicated die with high up-front tooling investment. It is also noted that the inner wall, outer wall, and perimeter wall of the blade housing of this groover also have no raised internal features such as bosses, ribs, or protruding components formed on or fastened to them which may serve to increase the forcefulness of airflow towards the inlet hole of a duct.

Each of the blade housings for these prior art groovers also includes an internal inlet hole for an integral duct having an outlet outside the blade housing. The hole and the duct are positioned to convey cuttings from the blade using the force of airflow to an outside collection bag. Airflow is generated by the spinning circular groover blade. Cuttings fly off the teeth on a tangent. For these reasons, it is preferred that the internal hole be positioned at some point trailing the spinning teeth of the blade Furthermore, it is preferred that this hole be centered longitudinally on the vertical plane defined by the blade, as airflow down the hole will be most forceful on this center. Lastly, it is preferred that the perimeter wall of the housing extend vertically to a point substantially tangent to the upper edge of the inlet hole and upper wall forming the top of the duct. This way the airflow does not change direction on its way down the duct and thereby lose forcefulness.

In prior art groovers, the inlet hole has typically been located in one of two areas within the blade housing. For the Leister BA Flooring Groover, the hole is located at a forward location nearest the area where the teeth of the blade first enter the blade housing. This location is preferred because it is near the area where cuttings first come off the teeth and have high velocity. However, for greatest effect, this type of duct must be oriented vertically. The Leister BA Flooring Groover also includes a secondary tube attached at the outlet of the duct having a bend at its distal end. The tube raises the collection bag above the groover, keeping it out of the way of the motor. The bent end directs the bag away from the user or wall surfaces.

The ducting of the Leister groover requires a number of costly components which are unnecessary and reduce the usability of the tool. Ejecting the cuttings vertically means that the cuttings are slowed by gravity and can tend to fall back into the blade housing. Hence the Leister groover includes a fan within the blade housing to generate additional airflow. This makes the blade housing of this tool very large, creating a heavy and bulky tool. Furthermore, the vertical tube places the collection bag in the users' line of sight along the seamline.

The Frasmaster groover has a similar, forward hole within the blade housing, and also includes a secondary, vertically oriented tube mounted on its vertical duct. However, this groover does not have an internal fan within the blade housing as the Leister does.

The Frasjunior groover has a hole located at a rearward location within the blade housing. The airflow from the blade is powerful enough to carry most cuttings through the rearward hole and down the rearward projecting duct. The collection bag can be mounted directly on the duct as it faces behind the motor and the user. This design is preferred for better usability and economy of components. However, not all cuttings enter a reward hole due to inadequate airflow. If more airflow generated by the spinning blade could be focused towards the rearward hole, cuttings collection could be improved, without the need for a bulky or significantly more expensive tool.

The Grooving Machine EASY 5000 has a rearward located hole and rearward duct, similar to the Frasjunior. The inner wall of the Grooving Machine EASY 5000 includes a slot hollowing an area in front of and beneath the inlet hole. Presumably, in the process of die making, the inner wall was inadvertently made too thick, with the result that it blocked half of the hole. As a result, the inner wall had to be hollowed to expose the hole. The relieved slot creates an eddy at its leading edge. Furthermore, airflow must divert into the slot to enter the inlet hole, reducing its force. It would be preferable to have an inner wall that did not block such a large portion of the inlet hole, and other additional features that actually tended to divert additional airflow towards the inlet hole.

SUMMARY

Embodiments of the invention comprise a powered vinyl groover with a blade housing for a circular blade. The housing includes a inlet hole forming the first end of a duct to carry cuttings into a collection bag. Near the hole is an added fin which is a raised surface on any of the inner wall, outer wall, or perimeter walls of the blade housing extending longitudinally (and, in some embodiments, vertically) into the blade housing as close as possible to the blade. The added fin causes airflow from the blade to be redirected towards the hole. As a result, more cuttings enter the hole and are carried by the duct into the collection bag. A fin is easily added to any of the prior art groovers previously discussed, having either a forward hole or rearward hole in their blade housing.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
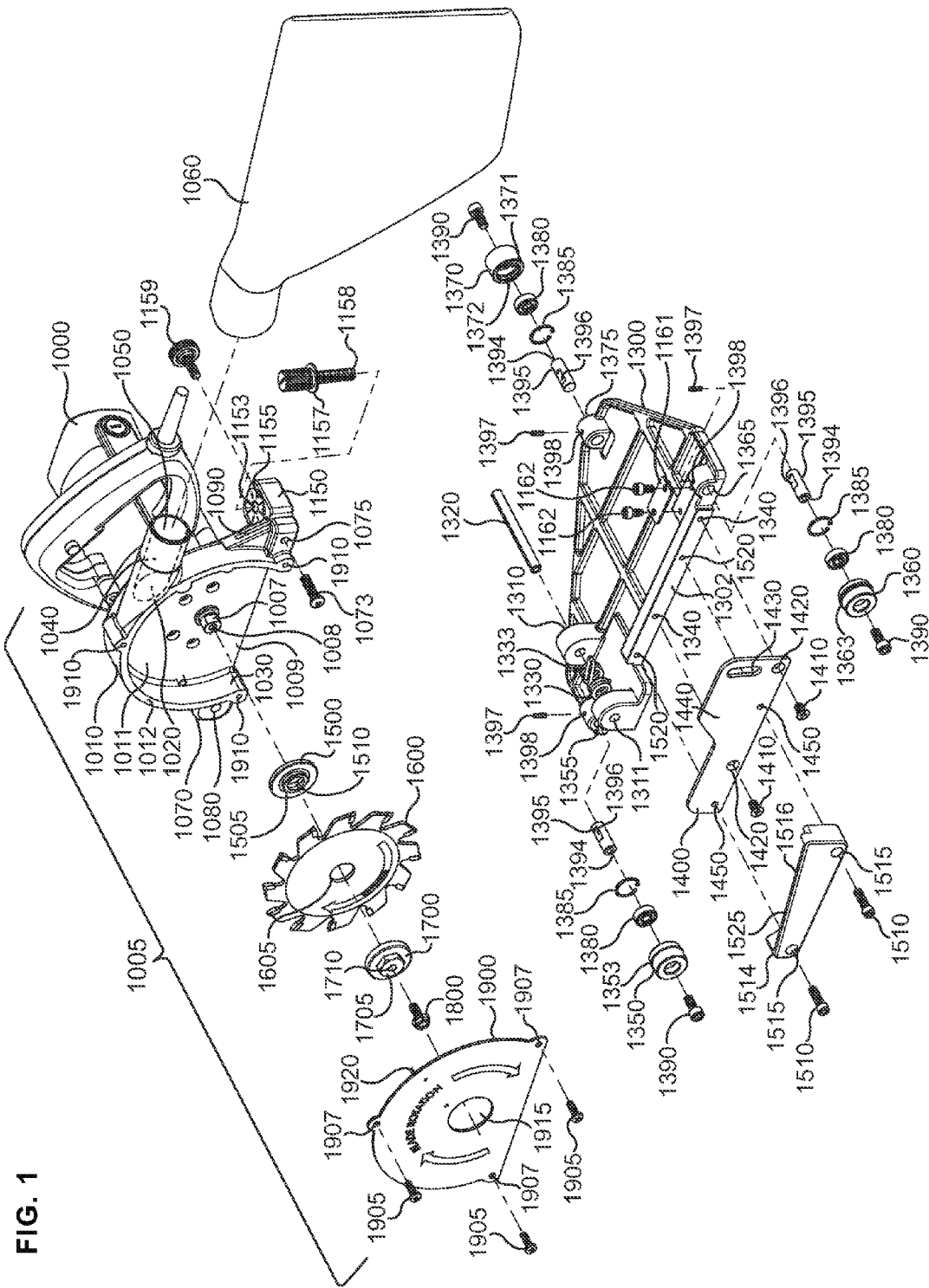
FIG. 1 is an exploded view of an electrically powered vinyl groover having a fin within the blade housing.

As shown in FIG. 1, an exploded view of the electrically powered vinyl groover 1005, the device has a motor 1000 which includes an attached blade housing 1010. Within blade housing 1010 is a hole 1020. As used herein, the terms "forward" and "rearward", when referring to a hole inside a blade housing which forms the first end of a duct for cuttings, describe the location of the hole in relation to a forward end of the groover's blade housing. A forward end of the groover's blade housing is shown as element 1030. A forward end of the blade housing is the area of the blade housing where the teeth of the blade (and cuttings) first enter the housing. Thus, for example, a forward hole is located close to the forward end of the blade housing (such as for the Leister BA Groover, or Frasmaster), and a rearward hole is located more at a distance from the forward end (such as the Frasjunior, or the device of FIG. 1). Therefore, with respect to the device of FIG. 1, hole 1020 is a rearward hole that forms a first end of a rearward duct 1040 which has a rearward opening 1050 opening outside blade housing 1010. A collection bag 1060 may be fitted over rearward opening 1050. As used herein, hole 1020, being the first end of a duct, and being within the blade housing, will be referred to as an inlet hole.

Blade housing 1010 is physically defined by inner wall 1011, perimeter wall 1012, outer wall 1013 (FIG. 3) formed by an inner surface of blade cover 1900, and a bottom wall 1516 formed by catch 1514. In one embodiment, blade housing 1010 is a die-casting including several other integral features, including a pivot arm 1070, a slot 1090, and a depth adjustment platform 1150. Pivot arm 1070 includes a pivot hole 1080. Motor 1000 is mounted to a base 1300 at holes 1310, 1311 by pivot pin 1320 being inserted through pivot hole 1080. Pivot pin 1320 also holds torsion spring 1330 that lifts motor 1000 as it is removed from a groove at the end of a grooving operation.

Figure 3:
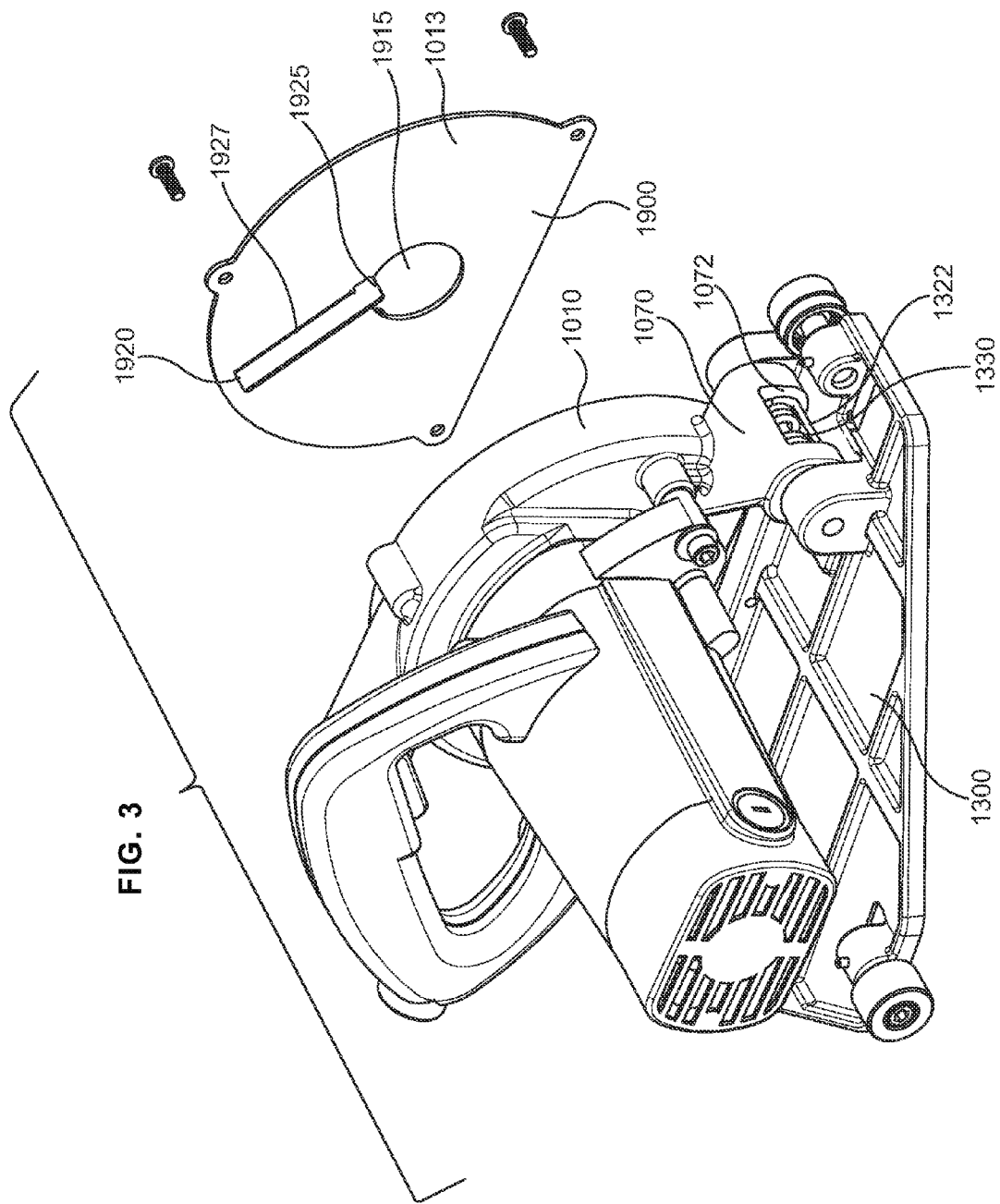
FIG. 3 is a partially exploded perspective view of the assembled electrically powered vinyl groover showing features of the fin.

The assembly of these components is as follows: Pivot pin 1320 is press fit through a first pivot hole 1310, and runs through pivot hole 1080 of pivot arm 1070. As shown in FIG. 3, a front perspective view of the assembled device, within pivot arm 1070 is a pivot arm slot 1072. A torsion spring 1330 is inserted within pivot arm slot 1072 such that its arms 1322 press against base 1300. Pressure on arms 1322 causes torsion spring 1330 to apply pressure through arm 1333 (FIG. 1) against the top of pivot arm slot 1072. This causes torsion spring 1330 to constantly urge the motor to a raised position. As shown in FIG. 1, to fasten the assembly, pivot pin 1320 runs through torsion spring 1330, and is and press fit into hole 1311.

Upright plate 1400 is affixed flush against a vertically machined surface 1302 of base 1300 at a right angle. Upright plate 1400 is attached to base 1300 by pan head screws 1410 which run through countersunk holes 1420 in upright plate 1400, and are fastened into tapped holes 1340 in base 1300. Upright plate 1400 has a slot 1430 and a large flat 1440. Flat 1440 inserts into slot 1090 of blade housing 1010. Flat 1440 of upright plate 1400 ensures the pivoting motion of motor 1000 is always vertical in relation to base 1300. Slot 1430 in upright plate 1400 aligns with hole 1075 in blade housing 1010. A threaded fastener 1073 may be inserted through hole 1075 and slot 1430 and fastened within an internal tapped hole (not shown). Slot 1430 functions to control the angular motion of motor 1000. When fastener 1073 contacts the top of slot 1430, it functions to set a maximum upward motion for the motor. When fastener 1073 contacts the bottom of slot 1430, it functions to set a maximum grooving depth for a blade.

Figure 4:
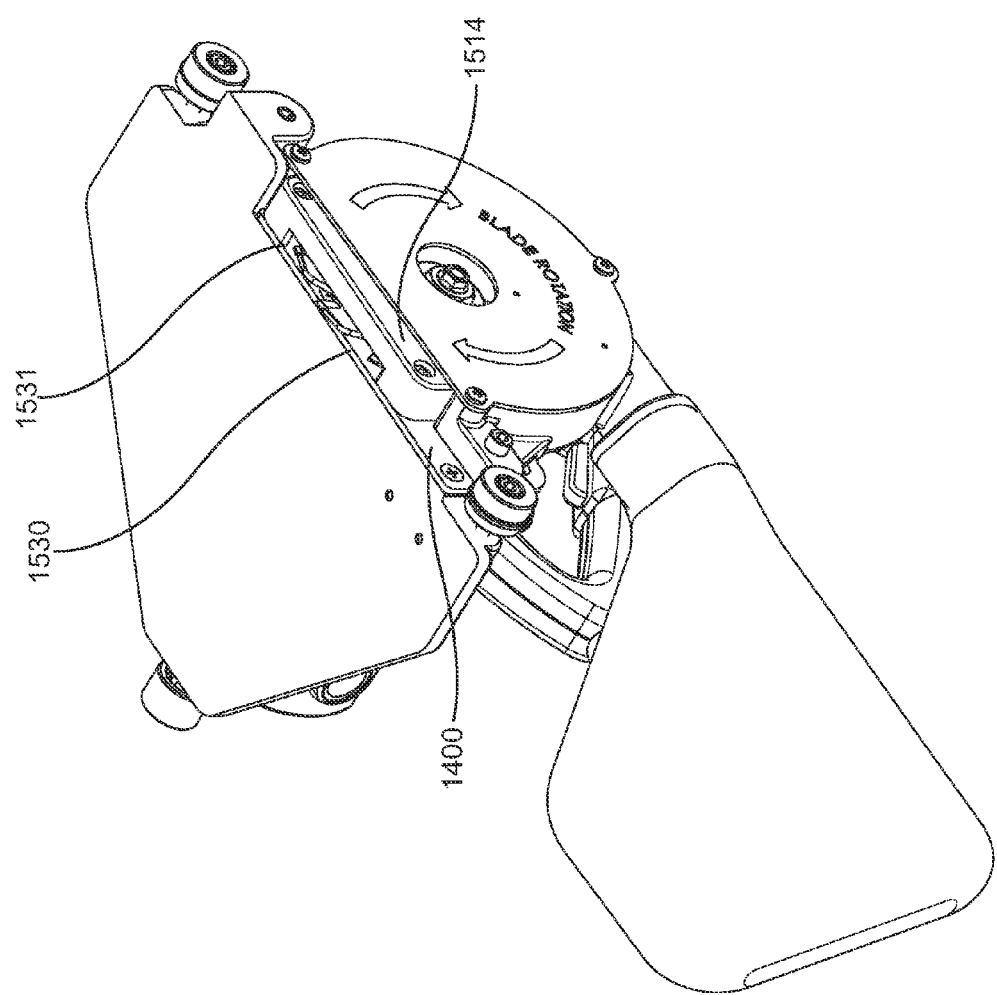
FIG. 4 is a bottom view of the assembled device, showing how a blade opening is formed when a catch is fastened against an upright plate on the base.

Catch 1514 is fastened against upright plate 1400 by threaded fasteners 1510 inserted first through counterbored holes 1515, then through holes 1450 of upright plate 1400, and finally fastened into tapped holes 1520 in base 1300. Catch 1514 forms the bottom for blade housing 1010. As shown in FIG. 4, catch 1514 has slot 1530 that defines a blade opening 1531 when catch 1514 is fastened against upright plate 1400. Blade opening 1531 is as narrow as possible to prevent cuttings and airflow from exiting. As used herein, and as shown in FIG. 1, catch 1514 when fastened against upright plate 1400 (and in turn against wall 1302 of base 1300) forms a fixed bottom wall for blade housing 1010. As best viewed in FIG. 4, catch 1514 fits within the assembled blade housing and forms a bottom for this assembly as it pivots up or down, thus sealing the bottom to preventing cuttings or dust from escaping.

As shown in FIG. 1, depth adjustment platform 1150 includes a tapped hole 1153 and a depth adjustment scale 1155. Depth adjusting knob 1157 is threaded into tapped hole 1153 until end 1158 extends through the bottom of depth adjustment platform 1150. End 1158 of depth adjustment knob 1157 contacts base 1300 at plate 1161 to form a variable means of depth control. Depth locking knob 1159 threads into a back side hole (not shown) in depth adjustment platform 1150. Depth locking knob 1159 may contact depth adjusting knob 1157 within tapped hole 1153, preventing it from turning. This forms a means for holding a certain depth. Plate 1161 is preferably a thin steel stamping that protects base 1300 from repeated impacts from depth knob end 1158. Plate 1161 is fastened to base 1300 by two screws 1162.

The three wheels for guiding and rolling groover 1005 are all rotatably mounted to base 1300 with common components, but the profile of each wheel has a special function. The functions of each profile are as follows: Forward wheel 1350 has a thin edge 1353 on its outside surface. Thin edge 1353 runs within the seam between two sheets of vinyl prior to cutting the groove. This guides the direction of groover 1005 as it moves forward. Forward wheel 1350 is mounted at a forward hole 1355 in base 1300. Rearward wheel 1360 has a wide edge 1363 on its outside surface. Wide edge 1363 runs in the area of the seam just grooved by the blade. Thus, wide edge 1363 tracks in the groove and keeps the back of groover 1005 from moving sideways. Rearward wheel 1360 is mounted within a rearward hole 1365. Side wheel 1370 is mounted to the side in side hole 1375, and has only a flat profile, with no edge. Side wheel 1350 rides on the face of the flooring material, serving to stabilize the back of the groover as it rolls. As used herein, forward wheel 1350 and rearward wheel 1360 will be referred to as guide wheels as they control the direction of the device along a seamline.

Forward wheel 1350, rearward wheel 1360, and side wheel 1370 are rotatably and adjustably mounted to base 1300 with the following components: A bearing 1380 is inserted within a inner hole in each wheel (such as hole 1371 in side wheel 1370). Bearing 1380 is held within the hole of each wheel by means of a snap ring 1385 being inserted within a snap ring groove located just outside bearing 1380 (such as snap ring groove 1372 in wheel 1370). Each wheel is then fastened into a tapped hole 1394 in an axle 1395 by means of a threaded fastener 1390. Each wheel and axle assembly is inserted into its respective hole. Each axle is movably fastened within its respective hole by means of a threaded set screw 1397 being threaded through a tapped hole 1398 and tightened down on a flat 1396 on a top surface of each axle 1395. Thus, each wheel may independently be moved longitudinally closer or further from the base 1300 by loosening a set screw 1397 and sliding an axle inwards or outwards. For forward wheel 1350 and rearward wheel 1360, the ability of each wheel to be moved longitudinally in or out provides a means of alignment for edges 1353, 1363. For the groover to track straight within a seamline, edges 1353, 1363 must be precisely aligned with respect to each other and also the centerline of the blade.

Spindle 1007 has a "double-D" shape with two flats on its external profile suitable for driving a blade. Blade 1600 is mounted to spindle 1007 by way of the following components: First mounted onto spindle 1007 is an inner clamp 1500 having an outer boss 1505 and a through hole 1510. Outer boss 1505 extends through hole 1605 of blade 1600 providing a bearing surface for hole 1605 of blade 1600. Spindle 1007 is long enough to extend through hole 1510 of inner clamp 1500 and hole 1605 of blade 1600 in order to provide a driving surface for an outer clamp 1700.

Outer clamp 1700 is next mounted on spindle 1007. Outer clamp 1700 mates with spindle 1700 within an internal "double-D" cutout (not shown). Outer clamp 1700 has a hex shaped boss 1705 and a through hole 1710. Hex-head bolt 1800 is inserted through holes 1710 of outer clamp 1700, 1605 of blade 1600, and 1510 of inner clamp 1500, and threads into a tapped hole 1008 in spindle 1007. Tapped hole 1008 and hex head bolt 1800 are configured with left-handed threads.

Figure 2:
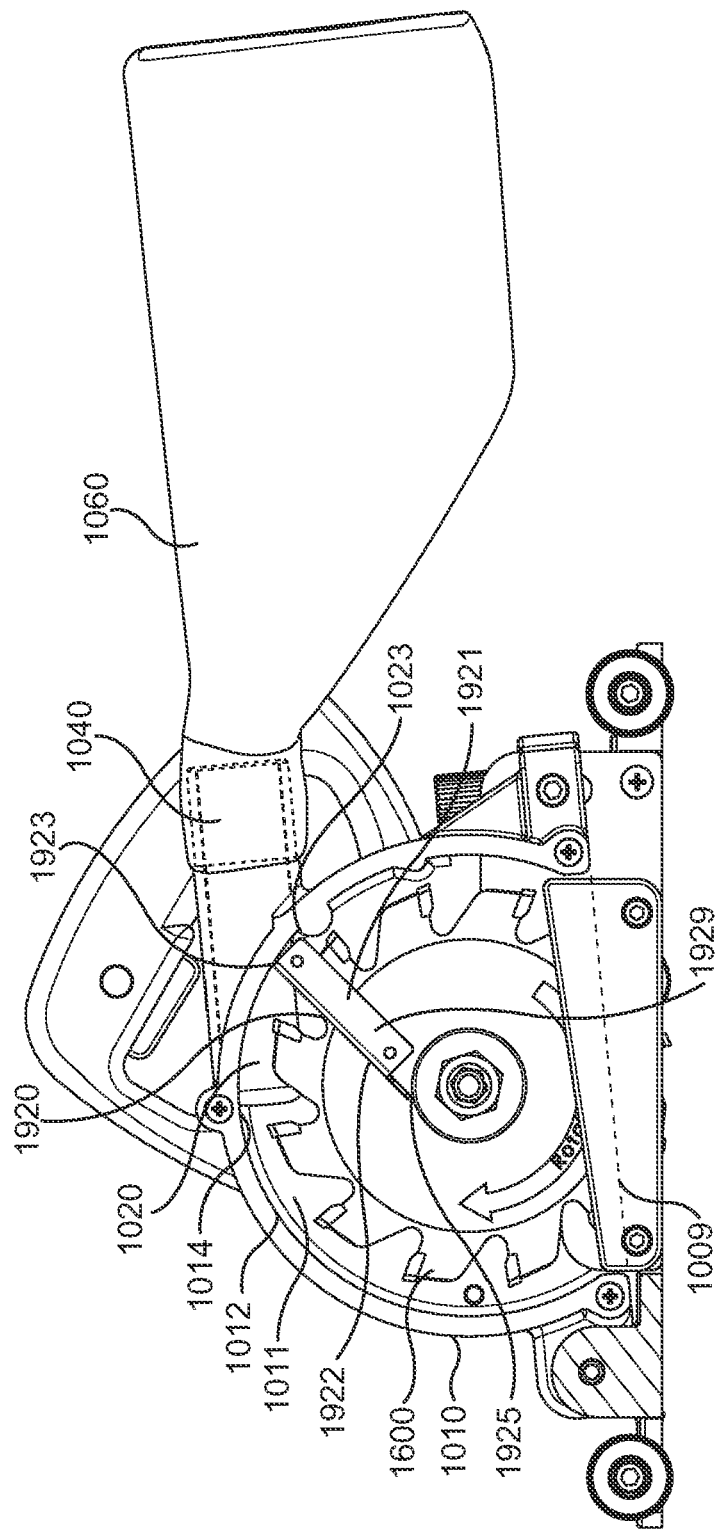
FIG. 2 is a section view of the assembled electrically powered vinyl groover showing the location and angle of the fin.

Blade cover 1900 is installed after blade 1600 with three threaded fasteners 1905 running through three holes 1907 and threading into three tapped holes 1910 in blade housing 1010. Blade cover 1900 is a flat metal part easily formed as a steel stamping. As shown in FIG. 3, blade cover 1900 forms an outer wall 1013 for blade housing 1010. Blade cover 1900 includes a hole 1915 allowing insertion of the wrenches necessary for removal of the blade. Blade cover 1900 includes a fin 1920. As shown in FIG. 2, fin 1920 is formed by means of an "L-shaped" right-angle bracket 1929. Bracket 1929 has a first mounting leg 1921 which may be fastened by spot welding onto the inner (blade facing) side of blade cover 1900 (FIG. 1). A second fin leg 1922 extends inward within blade housing 1010 towards blade 1600 as far as possible without contacting blade 1600. In an alternative embodiment, the fin 1920 may be integral with the blade housing 1010 or with the blade cover 1900. Accordingly, the fin 1920 is preferably a raised surface that extends from any of the interior wall surfaces of the blade housing 1010 (for example, a vertical wall surface) towards the blade 1600. The feature of a raised surface, rather than a reshaping of the housing 1010 itself to increase the amount of airflow directed toward the inlet hole of the duct, is preferred for a number of reasons. For example, it results in increased airflow towards the duct 1040, it enables a more simple design of the housing 1010, and it enables retrofitting of existing groovers and/or blade housing production tooling with a feature like fin 1920.

As shown in FIG. 2, fin 1920 takes airflow generated by spinning blade 1600 and channels it towards rearward hole 1020. As a result, more airflow generated by the blade is diverted in the direction of rearward hole 1020, and more cuttings are carried down rearward duct 1040 and into collection bag 1060. Fin 1920 is mounted at an angle of about 45° in relation to a horizontal bottom edge 1009 of blade housing 1010. Fin 1920 has a first upper end 1923 just above a lower edge 1023 of hole 1020, and a second end 1925 intersecting hole 1915 in blade cover 1900 (FIG. 3). FIG. 2 also illustrates how the topmost edge 1014 of perimeter wall 1012 is positioned vertically to intersect the top edge of inlet hole 1020 substantially at a tangent. This is preferred because airflow from the blade can flow straight down the inlet with minimal interference from the perimeter wall. FIG. 2 also illustrates how the inner wall 1011 of blade housing 1010 is substantially relieved from inlet hole 1020. This is preferred because it does not block the opening of inlet hole 1020 as the inner wall of the Grooving Machine EASY 5000 does. Hence, there is no need for a hollowed slot that generates an eddy or forces the air to divert in order to enter the inlet hole, which both reduce the force of the airflow.

As shown in FIG. 2, the 45° angle of fin 1920 redirects a wide section of airflow generated by blade 1600 towards rearward hole 1020. A greater angle may redirect more air towards a top portion of the perimeter wall of blade housing 1010, rather than channeling it through rearward hole 1020. Such a design may cause cross turbulence in the airflow and could cause cuttings to hit the top portion of the perimeter wall of the blade housing 1010. Less cuttings would enter rearward hole 1020 as a result. On the other hand, a lesser angle would redirect more air at a lower portion of the perimeter wall of blade housing 1010 beneath hole 1020, causing chips to hit at a lower portion of the perimeter wall of the blade housing. Less cuttings would enter rearward hole 1020 as a result. For this reason, the 45° angle is preferred. However, the presence of the fin at various angles in this range could still increase the amount of cuttings directed towards a rearward hole, compared to having no fin whatsoever. In other embodiments, for example where the duct 1040 is not oriented rearward, an orientation of the fin 1920 other than at a 45° angle may be preferred.

The length of fin 1920 places the upper end 1923 of fin 1920 at an elevation above a lower edge 1023 of rearward hole 1020. This ensures most airflow is directed above the lower edge 1023 of rearward hole 1020 and more towards the center of the hole 1020 where airflow is most forceful. As shown in FIG. 3, the length of fin 1920 places a lower end 1925 roughly at a point where it intersects with the outer edge of hole 1915 in blade cover 1900. This length for fin 1920 is preferred because it redirects as wide a section of airflow as possible, without impeding wrenches to enter at hole 1915 of blade cover 1900. However, a shorter or longer length could still increase the amount of cuttings directed towards a hole, compared to having no fin whatsoever.

As shown in FIG. 2, fin 1920 is formed by means of a right angle bracket 1929. The right angle between mounting leg 1921 and fin leg 1922 forms a flat surface that is optimal for redirecting airflow towards hole 1020. This flat surface is best seen as fin surface 1927 in FIG. 3. Having fin surface 1927 be at a right angle to blade cover 1900 is preferred. A design with an angle less than 90° may cause some airflow to be redirected against the inner surface of blade cover 1900, while a design with an angle greater than 90° would allow air to spill over the surface. Either such design may result in reduced airflow redirected towards hole 1020. However, having a fin with a surface at an angle in the area of 90° in relation to the surface from which it extends could still increase the amount of cuttings directed towards a hole, compared to having no fin whatsoever.

A fin may be added to prior art electrically-powered vinyl groovers by adding a bracket or any sort of raised surface (such as a boss or rib, in the case of integral fins in a casting) at locations near a hole forming a first end of duct for transfer of cuttings. The fin forms a surface redirecting airflow towards a hole, irrespective of the means of mounting the fin, or forming the fin, in the case that the fin is a rib or boss in a casting. As used herein, a fin formed from the same material forming a blade housing or blade cover element will be described as integral. Thus, a fin formed as rib or boss feature in a cast blade housing, or a welt feature on a stamped blade cover, would both be fins that are integral with the elements.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure. For example, although described in the context of a vinyl groover, powered groovers may be used on other types of flooring materials.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A powered groover for cutting a groove along a seam formed by adjacent sheet flooring materials, the groover comprising:
    a motor having a drive shaft;
    a blade mount mechanically linked to the drive shaft such that when the drive shaft is rotated by the motor, the blade mount is rotated, and such that when a circular groover blade is mounted on the blade mount, the circular groover blade is rotated;
    a blade housing coupled to the motor and adapted to cover at least a portion of the circular groover blade when mounted on the blade mount during operation of the groover;
    a plurality of guide wheels for directing the circular groover blade when mounted on the blade mount during operation of the groover along a seam formed by adjacent solid sheet flooring materials, the guide wheels including a front wheel that has a thin edge configured to run within the seam and a rear wheel that has a wide edge configured to run within a groove cut along the seam;
    a duct having an inlet and an outlet, the duct coupled to the blade housing for allowing cuttings removed by the circular groover blade when mounted on the blade mount during operation of the groover to exit the blade housing; and
    a fin comprising a raised surface extending from a surface on the inside of the blade housing towards the circular groover blade when mounted on the blade mount, the fin mounted to direct an airflow generated by the rotation of the circular groover blade when mounted on the blade mount during operation of the groover towards the inlet of the duct.

2. The powered groover of claim 1, wherein the blade housing comprises an inner wall, an outer wall, a perimeter wall joining the inner wall and outer wall, and a bottom wall.

3. The powered groover of claim 2, wherein the raised surface of the fin extends from any of the inner wall, the perimeter wall, or the outer wall of the blade housing.

4. The powered groover of claim 1, wherein the raised surface of the fin is perpendicular to the cutting plane of the circular groover blade when the circular groover blade is mounted on the blade mount.

5. The powered groover of claim 1, wherein the fin comprises a bracket mounted within the blade housing.

6. The powered groover of claim 1, wherein the fin is integral to the blade housing.

7. The powered groover of claim 1, wherein the blade housing comprises a detachable blade cover, and the fin is integral to the blade cover.

8. The powered groover of claim 1, wherein the fin is mounted at an angle of about 45 degrees in relation to a base plane that contains the guide wheels.

9. The powered groover of claim 1, wherein the fin has an upper end at least at an elevation of the inlet of the duct, and wherein the fin extends to a lower end below the elevation of the inlet of the duct.

10. The powered groover of claim 9, wherein the upper end of the fin extends above the inlet of the duct.

11. The powered groover of claim 9, wherein a portion of the fin between the first and second ends thereof transverses a perimeter of a blade attached to the motor.

12. The powered groover of claim 1, wherein the duct is a rearward duct.

13. The powered groover of claim 1, further comprising:
    the circular groover blade mounted on the blade mount and attached to the motor within the blade housing.

14. The powered groover of claim 1, further comprising:
    a dust collection bag attachable to the outlet of the duct.

* * * * *